United States Patent
Shpunt et al.

(10) Patent No.: US 8,717,488 B2
(45) Date of Patent: May 6, 2014

(54) OBJECTIVE OPTICS WITH INTERFERENCE FILTER

(75) Inventors: Alexander Shpunt, Tel Aviv (IL); Haim Bezdin, Rishon Lezion (IL); Shimon Yalov, Nes Ziona (IL)

(73) Assignee: Primesense Ltd., Tel Aviv (IL)

( * ) Notice: Subject to any disclaimer, the term of this patent is extended or adjusted under 35 U.S.C. 154(b) by 204 days.

(21) Appl. No.: 13/351,242

(22) Filed: Jan. 17, 2012

(65) Prior Publication Data

US 2012/0182464 A1    Jul. 19, 2012

Related U.S. Application Data

(60) Provisional application No. 61/433,536, filed on Jan. 18, 2011, provisional application No. 61/439,888, filed on Feb. 6, 2011.

(51) Int. Cl.
*H04N 5/225*    (2006.01)
*G02B 5/28*    (2006.01)

(52) U.S. Cl.
USPC .......................................... 348/342; 359/589

(58) Field of Classification Search
USPC .......... 348/335, 340, 342; 359/577, 580, 581, 359/589, 590
See application file for complete search history.

(56) References Cited

U.S. PATENT DOCUMENTS

| | | | | |
|---|---|---|---|---|
| 4,832,448 A | * | 5/1989 | Jones | 359/581 |
| 5,685,358 A | * | 11/1997 | Kawasaki et al. | 164/120 |
| 6,476,851 B1 | * | 11/2002 | Nakamura | 348/65 |
| 6,507,442 B2 | * | 1/2003 | Kashima et al. | 359/656 |
| 7,006,141 B1 | * | 2/2006 | Neil et al. | 348/360 |
| 7,110,034 B2 | * | 9/2006 | Suda | 348/340 |
| 2008/0240502 A1 | | 10/2008 | Freedman et al. | |
| 2011/0205421 A1 | | 8/2011 | Shpunt et al. | |
| 2011/0255051 A1 | * | 10/2011 | McCabe et al. | 351/163 |

FOREIGN PATENT DOCUMENTS

| | | |
|---|---|---|
| WO | 0133200 A1 | 5/2001 |
| WO | 2007105205 A2 | 9/2007 |

* cited by examiner

*Primary Examiner* — Timothy J Henn
(74) *Attorney, Agent, or Firm* — D. Kligler I.P. Services Ltd.

(57) ABSTRACT

Optical apparatus includes an image sensor and an optical assembly, which is configured to focus optical radiation via an aperture stop onto the image sensor. The optical assembly includes a plurality of optical surfaces, consisting of a first, curved surface through which the optical radiation enters the assembly, a final surface through which the rays exit the assembly toward the image sensor, and at least two intermediate surfaces between the first and final surfaces. An interference filter, which has a center wavelength and a passband no greater than 4% of the center wavelength, and includes a coating formed on one of the optical surfaces. All rays of the optical radiation passing through the aperture stop are incident on the coating over a range of incidence angles with a half-width that is no greater than three fourths of the numerical aperture of the optical assembly.

16 Claims, 2 Drawing Sheets

OBJECTIVE OPTICS WITH INTERFERENCE FILTER

CROSS-REFERENCE TO RELATED APPLICATIONS

This application claims the benefit of U.S. Provisional Patent Application 61/433,536, filed Jan. 18, 2011, and of U.S. Provisional Patent Application 61/439,888, filed Feb. 6, 2011, both of which are incorporated herein by reference.

FIELD OF THE INVENTION

The present invention relates generally to optical systems, and particularly to systems and methods for focusing and filtering optical radiation.

BACKGROUND

Ambient radiation interference is a problem in many electronic imaging systems. In such systems, an image is formed on an image sensor by objective optics, which collect and focus optical radiation in a given wavelength range onto the image sensor plane. (Optical radiation, in the context of the present patent application and in the claims, may comprise any or all of visible, ultraviolet and infrared radiation.) In many applications, particularly for computer vision, the image is formed at a particular target wavelength. For example, in certain 3D imaging systems, patterned or pulsed light in a certain narrow band (typically in the infrared range) is projected onto a scene, and a camera captures an image of the pattern on the scene. In such applications, ambient background radiation collected from the scene at other wavelengths within the range of the objective optics tends to introduce spurious features and reduce the contrast (and hence reduce the quality) of the image captured by the image sensor.

In some applications of this sort, an interference filter is used in conjunction with the objective optics in order to permit optical radiation to reach the image sensor in only a narrow band of wavelengths, while rejecting radiation outside the band. One system of this sort is described, for example, in U.S. Patent Application Publication 2008/0240502, whose disclosure is incorporated herein by reference.

SUMMARY

Embodiments of the present invention that are described hereinbelow provide optical designs that are particularly adapted for narrowband filtering of collected light.

There is therefore provided, in accordance with an embodiment of the present invention, optical apparatus, including an image sensor and an optical assembly, which has a specified numerical aperture and is configured to focus optical radiation via an aperture stop onto the image sensor. The optical assembly includes a plurality of optical surfaces, consisting of a first, curved surface through which the optical radiation enters the assembly, a final surface through which the rays exit the assembly toward the image sensor, and at least two intermediate surfaces between the first and final surfaces. An interference filter, which has a center wavelength and a passband no greater than 4% of the center wavelength, includes a coating formed on one of the optical surfaces, which is chosen and configured so that all rays of the optical radiation passing through the aperture stop are incident on the coating over a range of incidence angles with a half-width that is no greater than three fourths of the numerical aperture.

Typically, the numerical aperture is at least 0.1, and the passband may be less than 2% of the center wavelength. In some embodiments, the half-width of the range of the incidence angles of the rays on the coating is less than one half of the numerical aperture. The incidence angles of all the rays on the coating are typically within 10° of a normal to the one of the optical surfaces.

In some embodiments, the coating of the interference filter is formed on one of the intermediate surfaces, which may be flat or concave. In an alternative embodiment, the coating of the interference filter is formed on the first surface.

There is also provided, in accordance with an embodiment of the present invention, optical apparatus, including an image sensor and an optical assembly, which is configured to focus optical radiation onto the image sensor. The optical assembly includes a plurality of optical surfaces, including a concave surface, and an interference filter including a coating formed on the concave surface.

There is additionally provided, in accordance with an embodiment of the present invention, optical apparatus, including an image sensor and an optical assembly, which is configured to focus optical radiation via an aperture stop onto the image sensor. The optical assembly includes a plurality of optical surfaces, including a curved surface having a center of curvature in a vicinity of the aperture stop, an interference filter including a coating formed on the curved surface.

There is further provided, in accordance with an embodiment of the present invention, a method for producing an imaging system, which includes providing an optical assembly having a specified numerical aperture and including a plurality of optical surfaces, consisting of a first, curved surface through which the optical radiation enters the assembly, a final surface through which the rays exit the assembly, and at least two intermediate surfaces between the first and final surfaces. The optical assembly is configured to focus optical radiation via an aperture stop onto an image sensor. The optical radiation is filtered using an interference filter, which has a center wavelength and a passband no greater than 4% of the center wavelength, and which includes a coating formed on one of the optical surfaces, which is chosen and configured so that all rays of the optical radiation passing through the aperture stop are incident on the coating over a range of incidence angles with a half-width that is no greater than three fourths of the numerical aperture.

The present invention will be more fully understood from the following detailed description of the embodiments thereof, taken together with the drawings in which:

DETAILED DESCRIPTION OF EMBODIMENTS

Overview

Figure 1:
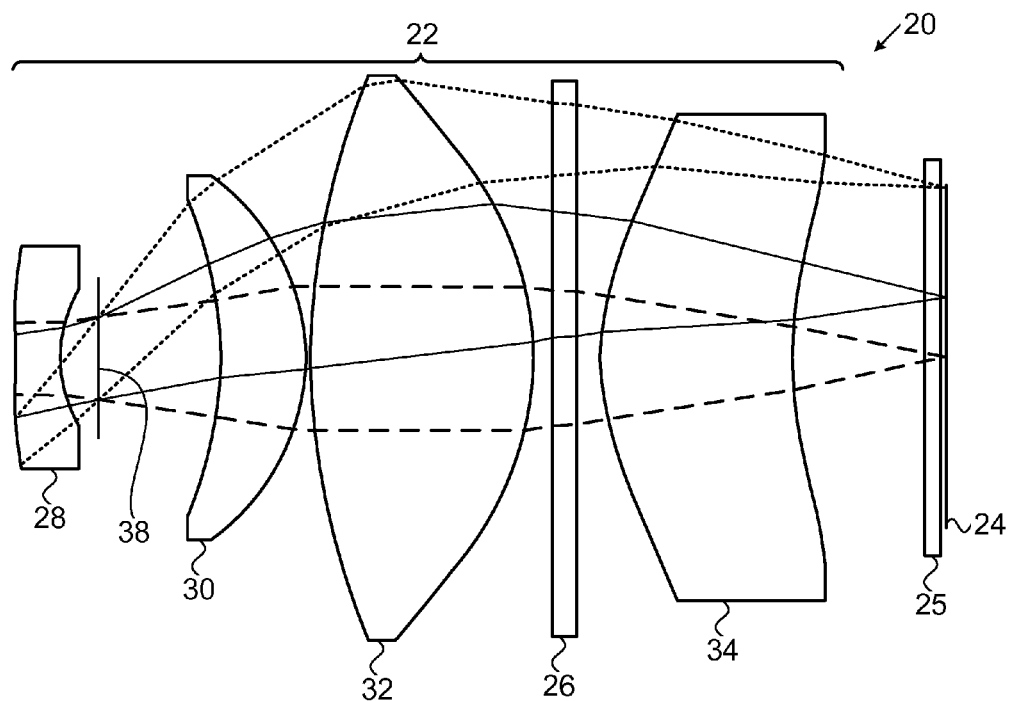
FIGS. 1-4 are schematic side views of imaging systems, in accordance with embodiments of the present invention.

The passband of optical interference filters is strongly dependent on the incident angle of the radiation on the filter. The center wavelength λ of the filter passband undergoes a blue shift with incident angle θ (relative to the normal) that is given by:

$$\lambda = \lambda_0 \sqrt{1 - \left(\frac{\sin\theta}{n}\right)^2} \quad (1)$$

wherein $\lambda_0$ is the design wavelength of the filter (at normal incidence), and n is the effective index of refraction of the filter.

For this reason, a narrowband interference filter that passes a certain central, target wavelength at normal incidence may block a ray of the same wavelength that is incident at a 10° angle, for example. When the filter is to be interposed in the path of focused radiation, such as in the objective optics of an electronic imaging system, the passband is typically made broad enough to pass the rays at the target wavelength over the full range of angles that is collected by the objective optics. The resultantly broad passband, however, permits a substantial amount of ambient radiation to reach the image sensor, as well. For this reason, the use of an interference filter in a narrowband imaging system becomes increasingly problematic with increasing numerical aperture (i.e., smaller F-number), since the angular spread of the rays grows with the numerical aperture.

Embodiments of the present invention that are described hereinbelow address this problem in a number of ways. Some embodiments provide multi-element objective lens systems in which the collected rays are collimated, or nearly collimated, at a selected location between the elements. The interference filter is then positioned in this selected location. Other embodiments use a curved interference filter, i.e., a filter created by depositing a number of thin-film layers on a curved surface, rather than on a flat substrate as in conventional interference filters. The curved surface is typically designed and positioned so as to minimize the range of incident angles of the rays on the surface. In an objective lens system, the concave surface of one of the lenses that faces the aperture stop may be used advantageously for this purpose. Alternatively, other lens surfaces or a purpose-made dome with negligible optical power may be used.

Generally stated, the disclosed embodiments provide optical apparatus, which comprises an image sensor and an optical assembly configured to focus optical radiation via an aperture onto the image sensor. This "optical assembly," as the term is used in the context of the present patent application and in the claims, does not necessarily comprise all the optical elements in the apparatus; and the overall optical system may include other elements occurring before or after the optical assembly in the optical path. For efficient light collection and high resolution, the optical assembly typically has a high numerical aperture, typically at least NA=0.1, and desirably at least NA=0.2. (The numerical aperture is approximately equal to half the angular aperture, at full width, of the optical assembly, and is related to the F-number, F#, by the formula NA≅½F#.) The optical assembly comprises multiple optical surfaces, including a first, curved surface through which the optical radiation enters the assembly and a final surface through which the rays exit the assembly toward the image sensor, with intermediate surfaces in between.

An interference filter is formed as a coating on one of the optical surfaces, with a narrow passband at normal incidence, typically no greater than 4% of the target (center) wavelength of the filter, and desirably less than 2% or even, in some cases, 1%. The surface on which the filter is formed is chosen and configured so that all rays of the optical radiation that pass through the aperture stop of the optical assembly are incident on the coating over a range of incidence angles with a half-width that is substantially less than the numerical aperture. In the disclosed embodiments, the half-width of this range of incidence angles is less than three fourths of the numerical aperture, and it may desirably be less than one half or even one fourth of the numerical aperture. (Typically, the incidence angles are within 10° of the normal to the surface, although the filter may alternatively be operated at non-normal incidence to change the passband.) As a result, the narrow passband of the interference filter is only minimally broadened due to the sort of angular effects that are described above.

Flat Interference Filter with Near-Collimated Incidence

In optical designs that are known in the art, a flat bandpass filter is typically placed between the last lens and the image sensor. In such placement schemes, the numerical aperture (NA) of the lens is directly transformed into angles of incident rays on the filter. The angles of the rays impinging on the filter from a given field vary from the CRA (chief ray angle) of the field minus NA to CRA+NA. For example, in a lens system with F#=2, NA=¼, and assuming CRA=0, the cone of angles incident on the filter can range from −¼ rad to +¼ rad and thus requires the filter to have a wide passband.

Some embodiments of the present invention address this problem by providing multi-element objective lens systems in which the collected rays are collimated, or nearly collimated, at a selected location between the elements. The interference filter is then positioned in this selected location. Thus, as opposed to the example given above, in an embodiment of the present invention for F#=2, the filter can be positioned in a location where the total angular span of the incident rays is no greater than 10° half-width (i.e.±10°), or possibly ±7°. This angular range is roughly half the angular span that exists between the last lens and the image sensor, or in other words, half the numerical aperture of the optical assembly. In other embodiments, a still smaller span can be achieved at the filter location, for example 5° or even 2.5° half-width. As a result, the filter maintains a narrow passband (less than 1-2% of the center wavelength, as given by equation (1) above) and a high level of rejection of out-of-band radiation, without substantially compromising the small size and high numerical aperture (low F-number) of the overall system.

FIG. 1 is a schematic side view of an imaging system 20, which implements the approach described above in accordance with an embodiment of the present invention. System 20 comprises an optical assembly 22, which focuses optical radiation onto an image sensor 24 (which is covered by a protective glass window 25). Full details of this design are presented in the above-mentioned U.S. Provisional Patent Application 61/433,536.

Optical assembly 22 is designed for operation at 830 nm, with an F-number of 2.4 and a half-image height at sensor 24 of 4.3 mm. Assembly 22 comprises four plastic aspheric lenses 28, 30, 32, 34, with an aperture defined by an aperture stop 38. Alternatively, one or more glass lenses may be used and provide advantages in terms of the thermal behavior of the design. The first surface of assembly 22 is the entrance surface (at the left side) of lens 28, while the final surface is the exit surface (at the right side) of lens 34. There are multiple optical surfaces in between, including a flat interference filter 26, with a thin-film coating on one side, between lenses 32 and 34.

Filter 26 is located in a region of relatively good collimation between the third and fourth lenses, such that rays passing through aperture stop 38 are incident on the filter within a range of approximately ±6.3°. The fourth lens (lens 34, adjacent to image sensor 24) has most of the optical power, effectively bringing the nearly-collimated light at filter 26 back into the range of convergence angles required by the overall NA. In some embodiments, filter 26 may have a bandwidth of less than 10 nm.

Appendix B of U.S. Provisional Patent Application 61/433, 536 presents an alternative design comprising five lenses, with a flat filter between the fourth and fifth lenses. This design similarly has an F-number of 2.4, but differs from the design described above in that the rays are incident on the filter over a range of only ±2.5°.

Curved Interference Filters

Figure 2:
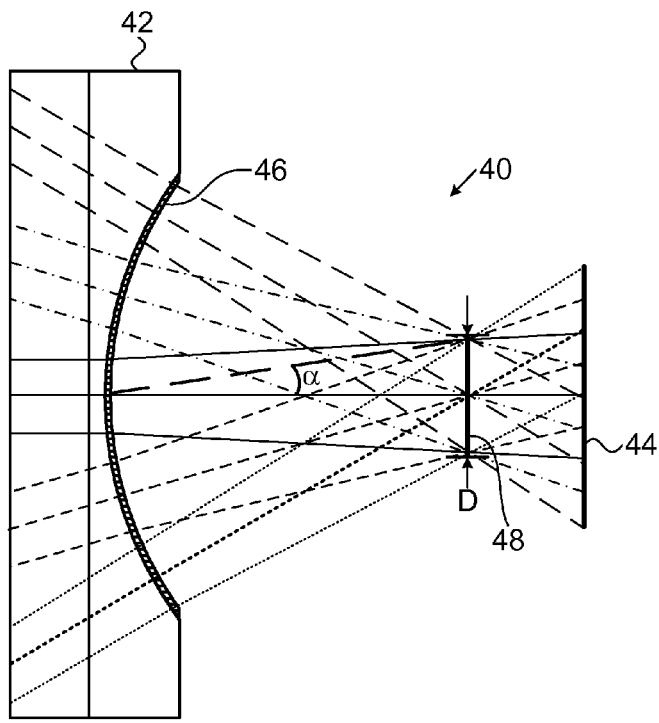

FIG. 2 is a schematic side view of a part of an imaging system 40, in accordance with another embodiment of the present invention. Just a part of system 40 is shown in order to simplify the explanation of the principles of this embodiment. A lens 42 is one element of an optical assembly, which focuses radiation via an aperture stop 48 onto an image sensor 44. The diameter D of aperture 48 is given by:

$$D = \frac{EFL}{F\#} \quad (2)$$

wherein EFL is the effective focal length of the optical assembly.

An interference filter coating 46 is formed on the inner, concave surface of lens 42, facing aperture stop 48. It can be seen in the figure that the range of angles of incidence of the rays on coating 46 (or equivalently, the exit angles from lens 42 in this particular embodiment), is considerably smaller than the full angular range of beam angles in system 40. An interference filter placed in the conventional position, in front of sensor 44, for example, would receive rays over a much larger angular range.

Assuming the radius of curvature of the surface on which coating 46 is formed is R, centered in the plane of aperture stop 48, the maximum angle α formed by the focused rays relative to the normal to coating 46 will be:

$$\alpha = \tan^{-1} \frac{D}{2R} \quad (3)$$

By appropriate choice of design parameters and constraints, α can generally be held to less than 10°, and possibly 5-7° or less, even in low-F designs (F#≤2). Consequently, the bandwidth of the filter formed by coating 46, as given by the first equation above, can be held to within about 1% of the target wavelength of the design of system 40.

Figure 3:
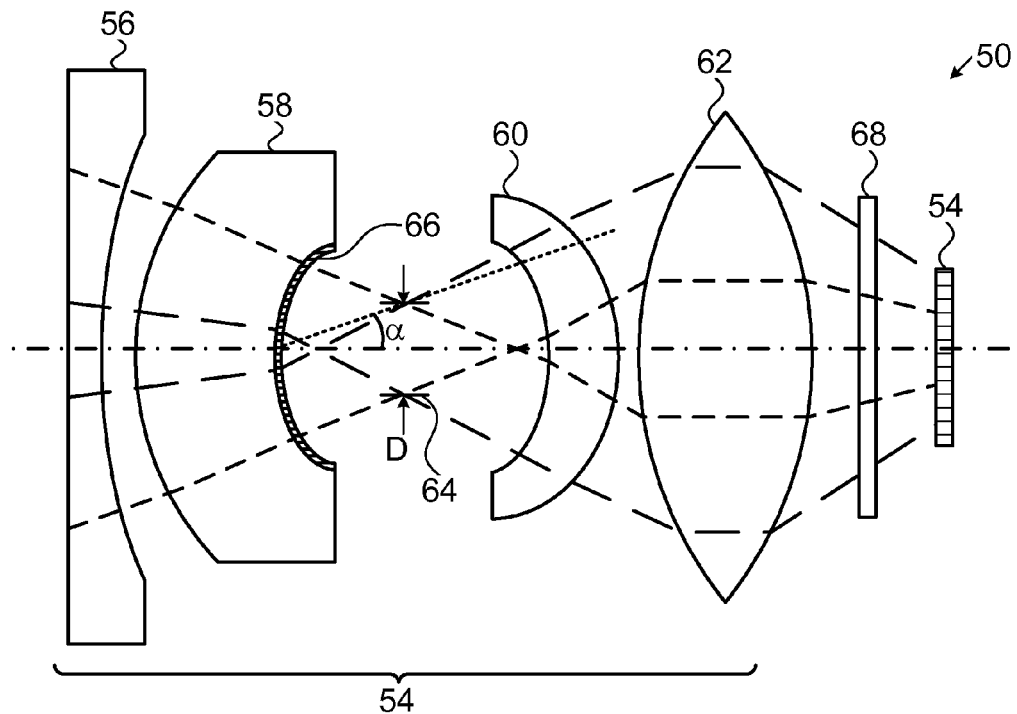
Figure 4:
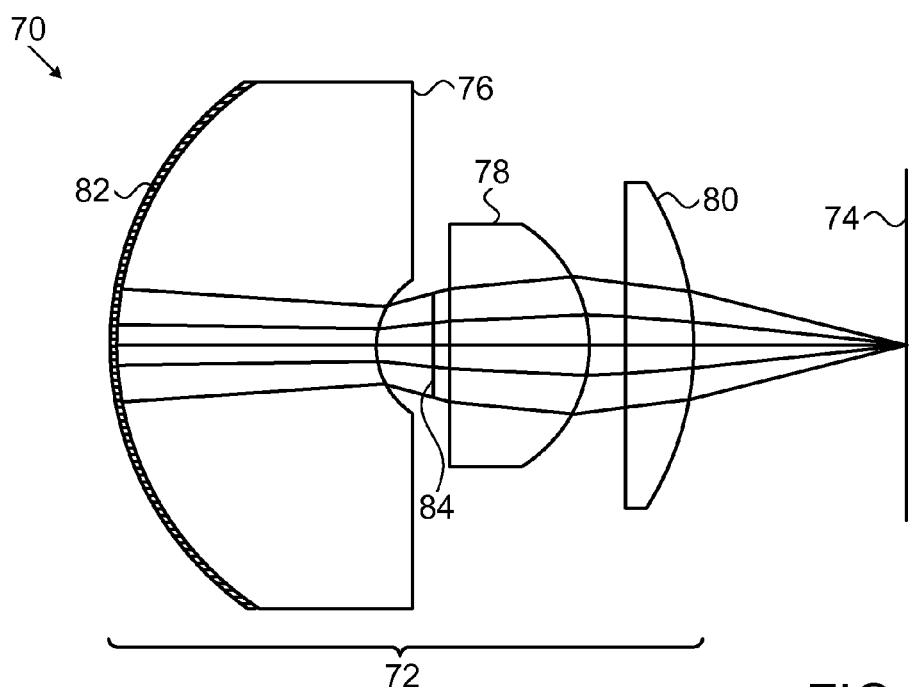

It is not necessary in this embodiment, and in the embodiments shown in FIGS. 3 and 4, that the center of curvature of the surface on which the filter is formed be precisely located in the aperture stop. Rather, it is generally sufficient that the center of curvature be in the vicinity of the aperture stop, i.e., that the concave side of the surface faces the aperture stop, with a center of curvature sufficiently close to the aperture stop so that the rays meet the constraints specified above with respect to the angle α. This same constraint can be applied to aspheric surfaces, by defining the center of curvature of such a surface as the center of the sphere that best fits the surface.

FIG. 3 is a schematic side view of an imaging system 50, which implements the principles explained above in reference to FIG. 2, in accordance with an embodiment of the present invention. An optical assembly 52 collects and focuses optical radiation onto an image sensor 54. Assembly 52 comprises lenses 56, 58, 60 and 62 in a telecentric configuration, with an aperture stop 64 between lenses 58 and 60. An interference filter coating is formed on the inner, concave surface of lens 58, facing the aperture stop. The filter thus maintains a narrow passband and enjoys a small range of incident ray angles, as explained above in reference to FIG. 2.

Optionally, a broadband filter 68, such as a suitable absorption filter, can be included in system 50 to block stray radiation that is far outside the passband of filter coating 66. Alternatively, this angle-insensitive filter can be implemented as a coating on any other suitable surface of the system.

FIG. 4 is a schematic side view of an imaging system 70, in accordance with yet another embodiment of the present invention. In this embodiment, an optical assembly 72 comprising lenses 76, 78 and 80 focuses radiation onto an image sensor 74. An interference filter coating 82 is formed on the first surface of assembly 72, i.e., on the outer surface of lens 76. This surface has a radius of curvature centered in an aperture stop 84 of assembly 72. Rays from the object space of system 70 that will be focused through aperture stop 84 by lens 76 are approximately collimated and impinge on coating 82 at nearly normal incidence. Therefore, the narrow passband of the interference filter is maintained.

Details of the design of system 70, as generated by ZEMAX® optical design software, are presented in the Appendix below.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

GENERAL LENS DATA:

| | |
|---|---|
| Surfaces | 8 |
| Stop | 3 |
| System Aperture | Image Space F/# = 2 |
| Glass Catalogs | CDGM TOPAS |
| Ray Aiming | Paraxial Reference, Cache on |
| X Pupil shift | 0 |
| Y Pupil shift | 0 |
| Z Pupil shift | 0 |
| X Pupil compress | 0 |
| Y Pupil compress | 0 |
| Apodization | Uniform, factor = 0.00000E+000 |
| Temperature (C.) | 2.00000E+001 |
| Pressure (ATM) | 1.00000E+000 |
| Adjust Index Data To Environment | Off |
| Effective Focal Length | 4.860405 (in air at system temperature and pressure) |
| Effective Focal Length | 4.860405 (in image space) |
| Back Focal Length | 5.285653 |
| Total Track | 19.24521 |
| Image Space F/# | 2 |
| Paraxial Working F/# | 2.000647 |

APPENDIX-continued

| | |
|---|---|
| Working F/# | 2.035555 |
| Image Space NA | 0.2424618 |
| Object Space NA | 0.0004039979 |
| Stop Radius | 1.146919 |
| Paraxial Image Height | 0 |
| Paraxial Magnification | 0 |
| Entrance Pupil Diameter | 2.430203 |
| Entrance Pupil Position | 7.691838 |
| Exit Pupil Diameter | 12.14158 |
| Exit Pupil Position | −24.20416 |
| Field Type | Angle in degrees |
| Maximum Radial Field | 50 |
| Primary Wavelength | 0.83 μm |
| Lens Units | Millimeters |
| Angular Magnification | 0 |

Fields: 7
Field Type: Angle in degrees

| # | X-Value | Y-Value | Weight |
|---|---|---|---|
| 1 | 50.000000 | 0.000000 | 1.000000 |
| 2 | 40.000000 | 0.000000 | 1.000000 |
| 3 | 30.000000 | 0.000000 | 1.000000 |
| 4 | 25.000000 | 0.000000 | 1.000000 |
| 5 | 16.666000 | 0.000000 | 1.000000 |
| 6 | 8.333000 | 0.000000 | 1.000000 |
| 7 | 0.000000 | 0.000000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |

Wavelengths: 3
Units: μm

| # | Value | Weight |
|---|---|---|
| 1 | 0.830000 | 1.000000 |
| 2 | 0.833000 | 1.000000 |
| 3 | 0.827000 | 1.000000 |

SURFACE DATA SUMMARY:

| Surf | Type | Radius | Thickness | Glass | Diameter | Conic |
|---|---|---|---|---|---|---|
| OBJ | STANDARD | Infinity | 3000 | | 7168.855 | 0 |
| 1 | STANDARD | 7.566495 | 6.080974 | D-ZK3 | 12.72584 | 0 |
| 2 | STANDARD | 1.721355 | 1.485521 | | 3.160919 | 0 |
| STO | STANDARD | Infinity | 0.3333889 | | 2.293837 | 0 |
| 4 | STANDARD | 25.48395 | 3.520046 | 5013X16 | 3.620891 | 0 |
| 5 | STANDARD | −2.726209 | 0.8397733 | | 5.79186 | −0.6997676 |
| 6 | STANDARD | 203.524 | 1.778849 | 5013LS-01 | 7.622203 | 0 |
| 7 | EVENASPH | −6.523185 | 5.20666 | | 7.827208 | 0 |
| IMA | STANDARD | Infinity | | | 8.435602 | 0 |

SURFACE DATA DETAIL:

| Surface | OBJ | STANDARD |
|---|---|---|
| Surface | 1 | STANDARD |
| Surface | 2 | STANDARD |
| Surface | STO | STANDARD |
| Surface | 4 | STANDARD |
| Surface | 5 | STANDARD |
| Surface | 6 | STANDARD |
| Surface | 7 | EVENASPH |

| | |
|---|---|
| Coeff on r 2 | 0 |
| Coeff on r 4 | −0.00092954022 |
| Coeff on r 6 | 5.95543e−005 |
| Coeff on r 8 | 6.4946076e−007 |

APPENDIX-continued

| | |
|---|---|
| Coeff on r 10 | 0 |
| Coeff on r 12 | 0 |
| Coeff on r 14 | 0 |
| Coeff on r 16 | 0 |
| Surface IMA STANDARD | |

EDGE THICKNESS DATA:

| Surf | X-Edge | Y-Edge |
|---|---|---|
| OBJ | 3003.471975 | 3003.471975 |
| 1 | 3.648289 | 3.648289 |
| 2 | 0.446231 | 0.446231 |
| STO | 0.397780 | 0.397780 |
| 4 | 1.759046 | 1.759046 |
| 5 | 2.572069 | 2.572069 |
| 6 | 0.470419 | 0.470419 |
| 7 | 6.479404 | 6.479404 |
| IMA | 0.000000 | 0.000000 |

GLOBAL Surface CENTER OF CURVATURE POINTS:
Reference Surface: 8

| Surf | X | Y | Z |
|---|---|---|---|
| 0 | — | — | — |
| 1 | 0.0000000000 | 0.0000000000 | −11.6787169829 |
| 2 | 0.0000000000 | 0.0000000000 | −11.4428825853 |
| 3 | — | — | — |
| 4 | 0.0000000000 | 0.0000000000 | 14.1386197402 |
| 5 | 0.0000000000 | 0.0000000000 | −10.5514913700 |
| 6 | 0.0000000000 | 0.0000000000 | 196.5385397085 |
| 7 | 0.0000000000 | 0.0000000000 | −11.7298450480 |
| 8 | — | — | — |

CARDINAL POINTS:

Object space positions are measured with respect to surface 1. Image space positions are measured with respect to the image surface. The index in both the object space and image space is considered.

| | Object Space | Image Space |
|---|---|---|
| W = 0.830000 (Primary) | | |
| Focal Length | −4.860405 | 4.860405 |
| Focal Planes | 6.719002 | 0.078993 |
| Principal Planes | 11.579407 | −4.781412 |
| Anti-Principal Planes | 1.858597 | 4.939398 |
| Nodal Planes | 11.579407 | −4.781412 |
| Anti-Nodal Planes | 1.858597 | 4.939398 |
| W = 0.833000 | | |
| Focal Length | −4.860388 | 4.860388 |
| Focal Planes | 6.718920 | 0.078715 |
| Principal Planes | 11.579308 | −4.781673 |
| Anti-Principal Planes | 1.858532 | 4.939103 |
| Nodal Planes | 11.579308 | −4.781673 |
| Anti-Nodal Planes | 1.858532 | 4.939103 |
| W = 0.827000 | | |
| Focal Length | −4.860391 | 4.860391 |
| Focal Planes | 6.719100 | 0.079221 |
| Principal Planes | 11.579491 | −4.781170 |
| Anti-Principal Planes | 1.858709 | 4.939611 |
| Nodal Planes | 11.579491 | −4.781170 |
| Anti-Nodal Planes | 1.858709 | 4.939611 |

The invention claimed is:

1. Optical apparatus, comprising:
   an image sensor; and
   an optical assembly, which has a specified numerical aperture and is configured to focus optical radiation via an aperture stop onto the image sensor, and which comprises:
   a plurality of optical surfaces, consisting of a first, curved surface through which the optical radiation enters the assembly, a final surface through which the rays exit the assembly toward the image sensor, and at least two intermediate surfaces between the first and final surfaces; and
   an interference filter, which has a center wavelength and a passband no greater than 4% of the center wavelength, and which comprises a coating formed on one of the optical surfaces, which is chosen and configured so that all rays of the optical radiation passing through the aperture stop are incident on the coating over a range of incidence angles with a half-width that is no greater than three fourths of the numerical aperture.

2. The apparatus according to claim 1, wherein the numerical aperture is at least 0.1.

3. The apparatus according to claim 1, wherein the passband is less than 2% of the center wavelength.

4. The apparatus according to claim 1, wherein the half-width of the range of the incidence angles of the rays on the coating is less than one half of the numerical aperture.

5. The apparatus according to claim 1, wherein the incidence angles of all the rays on the coating are within 10° of a normal to the one of the optical surfaces.

6. The apparatus according to claim 1, wherein the coating of the interference filter is formed on one of the intermediate surfaces.

7. The apparatus according to claim 6, wherein the one of the intermediate surfaces on which the coating is formed is flat.

8. The apparatus according to claim 6, wherein the one of the intermediate surfaces on which the coating is formed is concave.

9. The apparatus according to claim 1, wherein the coating of the interference filter is formed on the first surface.

10. The apparatus according to claim 1, wherein the one of the surfaces on which the coating of the interference filter is formed is a curved surface, having a center of curvature in a vicinity of the aperture stop.

11. A method for producing an imaging system, comprising:

providing an optical assembly having a specified numerical aperture and comprising a plurality of optical surfaces, consisting of a first, curved surface through which the optical radiation enters the assembly, a final surface through which the rays exit the assembly, and at least two intermediate surfaces between the first and final surfaces;

configuring the optical assembly to focus optical radiation via an aperture stop onto an image sensor; and filtering the optical radiation using an interference filter, which has a center wavelength and a passband no greater than 4% of the center wavelength, and which comprises a coating formed on one of the optical surfaces, which is chosen and configured so that all rays of the optical radiation passing through the aperture stop are incident on the coating over a range of incidence angles with a half-width that is no greater than three fourths of the numerical aperture.

12. The method according to claim 11, wherein the coating of the interference filter is formed on one of the intermediate surfaces.

13. The method according to claim 12, wherein the one of the intermediate surfaces on which the coating is formed is flat.

14. The method according to claim 12, wherein the one of the intermediate surfaces on which the coating is formed is concave.

15. The method according to claim 11, wherein the coating of the interference filter is formed on the first surface.

16. The method according to claim 11, wherein the one of the surfaces on which the coating of the interference filter is formed is a curved surface, having a center of curvature in a vicinity of the aperture stop.

* * * * *